3,338,938
CRYSTALLINE NICKEL SALT OF 1-NITROSO-2-NAPHTHOL
Albert S. Matlack, Hockessin, Del., assignor to Hercules Incorporated, a corporation of Delaware
No Drawing. Filed Feb. 24, 1964, Ser. No. 347,039
1 Claim. (Cl. 260—439)

This invention relates to a crystalline, light stable nickel chelate of 1-nitroso-2-naphthol and to a process of producing the same.

Nickel chelates of 1-nitroso-2-naphthol are known in the art. For example, Ilinski and Knorre, Ber. Deut. Chem., 18, 701 (1885), describe the brownish yellow precipitate of nickel 1-nitroso-2-naphthol formed by reacting either an aqueous or 50% acetic acid solution of 1-nitroso-2-naphthol with a nickel salt solution. Additionally, MacQueen in U.S. Patent 1,993,971 discloses that the iron complexes of 1-nitroso-2-naphthol prepared by the action of iron salts upon 1-nitroso-2-naphthol or its bisulfite compound are pigments possessing good fastness to light and resistance to alkalies, but hard in texture and difficult to disperse. Cobalt, nickel, and chromium are also said to form complex, strongly colored compounds with the nitroso naphthol, the complexes having different shades but otherwise similar properties.

The nickel 1-nitroso-2-naphthol compounds produced by these prior art methods, however, have very poor light stability and therefore cannot be used successfully as pigments in many applications.

A new crystalline form of the nickel chelate of 1-nitroso-2-naphthol has now been discovered which differs from that of the prior art and possesses outstanding light stability and is a highly effective pigment.

More specifically, the present invention is directed to a crystalline, light stable nickel chelate of 1-nitroso-2-naphthol which is characterized by exhibiting an X-ray diffraction pattern having strongest interplanar spacings, hereinafter referred to as d-spacings, at about 11.6, 9.6, 6.0, 4.9, 4.5, and 3.6 Angstroms, and which has a high degree of lightfastness, and to a process for producing the same.

The novel crystalline compound of the present invention is prepared by reacting a solution of 1-nitroso-2-naphthol in an inert liquid organic diluent which is a solvent for 1-nitroso-2-naphthol and is essentially a nonsolvent for the nickel chelate with a nickel compound, recovering the solid reaction product from the diluent, treating the recovered product with an electron donor solvent which is at least a partial solvent for the product while maintaining the temperature of the treatment at above about 50° C., and then recovering the nickel chelate from said electron donor solvent.

The 1-nitroso-2-naphthol used in forming the nickel chelate of this invention can be prepared by any of the methods given in the literature for nitrosating β-naphthol, as, for example, according to the preparations given in Beilstein's Handbuch der Organischen Chemie, 4th Ed.; 7, 712 (1925), 1st Supplement, 385 (1931), 2d Supplement, 647 (1948), Verlag von Julius Springer, Berlin, or by Marvel and Porter, Organic Syntheses, 2, 61 (1922).

Any nickel compound which is reactive with 1-nitroso-2-naphthol in the reaction medium can be used in the process of the invention, and the nickel compound can be added to the reaction medium either as a solid or an organic or aqueous solution. Preferred nickel compounds include such nickel salts as the sulfate, nitrate, bromide, chloride, acetate, formate, and 2-ethylhexanoate of nickel, or the like.

The amount of nickel compound used in the formation of the chelate should be sufficient to complex all of the nitroso naphthol, and preferably will not exceed the ratio of 1.1 atoms of nickel per 2 molecules of 1-nitroso-2-naphthol since large excesses of nickel should be avoided.

The method for preparing the nickel chelate of this invention requires the use of an inert liquid organic diluent which is a solvent for 1-nitroso-2-naphthol and is essentially a nonsolvent for the nickel chelate. Numerous organic diluents meet this criterion. Preferred diluents include alkanols such as methanol and ethanol, derivatives thereof such as 2-methoxyethanol, ethers such as tetrahydrofuran and the dimethylether of diethylene glycol, aromatic hydrocarbons such as benzene, toluene, and xylene, nitriles such as acetonitrile, and the like.

The reaction of 1-nitroso-2-naphthol in solution in the inert liquid organic diluent and the nickel compound takes place readily within relatively short periods of time to give a solid reaction product which may be recovered from the diluent using conventional methods for separating a solid from a liquid, i.e., decantation, filtration, centrifugation, and the like. The temperature at which the reaction is carried out will, of course, depend on the particular diluent employed as well as its solubility characteristics for 1-nitroso-2-naphthol. If desired, elevated temperatures and pressure can be employed although usually there is no particular advantage in operating at temperatures appreciably above those at which most of the 1-nitroso-2-naphthol is soluble in the diluent. Preferably, the reaction is carried out at from room temperature or below up to about 100° C. for times varying up to about several hours.

The process of the invention also requires the use of, at a temperature of at least about 50° C., an electron donor solvent which is at least a partial solvent for the nickel chelate. Solvents of this type possess at least one unshared pair of electrons which can become attached to a molecule capable of accepting an electron pair. Preferred donor solvents include dimethylformamide, N,N-dimethylacetamide, hexamethylphosphoramide, N-methylpyrrolidone, dimethylsulfoxide, sulfolane, and the like. The treatment with the electron donor solvent, as mentioned above, is carried out at a temperature of at least about 50° C. Just what effect the temperature has on the treatment is not understood. No matter what the effect is, it has been found that the use of an elevated temperature of at least about 50° C. is necessary to produce the nickel chelate of the invention. The treatment can be carried out in any manner known for wetting a solid with a liquid and at any temperature above 50° C. at which the solvent is a liquid. The amount of solvent employed should be sufficient to at least wet the product but may be present in excess of that amount. Large excesses will not be harmful to the treatment. Preferably, the solvent will be used within the range from about 10 to about 100 times the weight of the product. The length of the treatment likewise is not critical and will vary with solvents. Usually, from about one-half hour up to about six hours or longer will be sufficient to form the crystalline, light stable nickel chelate of the present invention.

Alternatively, the crystalline nickel chelate of this invention may be produced by reacting an aqueous ammoniacal solution of 1-nitroso-2-naphthol with a nickel compound at a temperature below about 40° C., recovering the solid reaction product from the aqueous medium, and then heating the recovered product at a temperature above about 120° C., but below its decomposition point, until the product is converted to the crystalline, light stable form of the nickel chelate. The heating can be carried out at any desired pressure, i.e., at atmospheric, superatmospheric, or subatmospheric pressure. The reaction product, prior to heating, can also be treated with an inert liquid organic diluent which is a partial solvent for the nickel chelate and which, during treatment, tends to reduce the particle size of the product and hence improve its transparency. The treatment with an organic diluent prior to heating is preferred. Suitable diluents for this purpose include alcohols, chlorinated hydrocarbons, aromatic hydrocarbons, and the like, and preferably ethanol, chloroform, tetrachloroethylene, chlorobenzene, o-dichlorobenzene, xylene, toluene, benzene, and the like.

The nickel chelate of this invention is believed to contain two molecules of 1-nitroso-2-naphthol per atom of nickel, and has the probable structure illustrated by the following formulae:

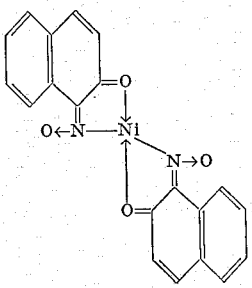

or

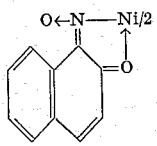

This nickel chelate is characterized by an X-ray diffraction pattern which exhibits strongest d-spacings at about 11.6, 9.6, 6.0, 4.9, 4.5, and 3.6 Angstroms, is a brown solid decomposing above about 300° C., is insoluble in water and most of the common organic solvents, and is generally soluble at least to some extent in one or more of the electron donor solvents listed above. In addition to exhibiting excellent lightfastness, the chelate possesses high transparency, good tinctorial strength, good stability to dilute acids and alkalies, good heat stability, and excellent bleed resistance in nonpolar solvents. It is of value as a pigment in numerous applications but has particular value as a pigment in enamels applied to metallic substrates or when used in conjunction with finely divided metallic particles, or as a pigment for plastics where it exhibits excellent lightfastness.

The invention will be illustrated by reference to the following examples in which all percentages and parts are by weight unless otherwise specified.

Example 1

A solution of 156 parts of a commercial 1-nitroso-2-naphthol in 1632 parts of boiling 95% ethanol was added to a boiling solution of 112 parts of nickel acetate tetrahydrate in 1143 parts of 95% ethanol, the mixture heated at reflux for 30 minutes, cooled, and then centrifuged. A brown solid was collected, washed with 1500 parts of 95% ethanol, and centrifuged again. The washed solid, still wet with ethanol, was next stirred into 3400 parts of dimethylformamide and heated at 100° C. until the ethanol distilled off. The undissolved solid was removed from the dimethylformamide by centrifugation, and the solid was washed three times with ether, the solid being separated after each wash by centrifugation. The washed solid, after drying, weighed 137 parts. Analysis of the solid product for $C_{20}H_{12}N_2NiO_4$ gave Example 1 (percent): carbon, 57.36; hydrogen, 3.37; nickel, 13.95. Theory (percent): carbon, 59.60; hydrogen, 3.00; nickel, 14.56.

and exhibited the following X-ray diffraction pattern:

| Line | 2θ | dA [1] | I [2] | Percent I/I max.[3] |
|---|---|---|---|---|
| 1 | 7.7 | 11.5 | 2,730 | 100 |
| 2 | 9.3 | 9.5 | 1,150 | 42 |
| 3 | 12.9 | 6.9 | 105 | 4 |
| 4 | 13.9 | 6.4 | 120 | 4 |
| 5 | 14.8 | 5.97 | 840 | 31 |
| 6 | 15.3 | 5.78 | | s |
| 7 | 18.1 | 4.90 | 740 | 27 |
| 8 | 19.8 | 4.49 | 645 | 24 |
| 9 | 21.6 | 4.11 | 420 | 15 |
| 10 | 22.9 | 3.87 | 135 | 5 |
| 11 | 24.8 | 3.59 | 1,155 | 42 |
| 12 | 25.9 | 3.43 | 190 | 7 |
| 13 | 29.5 | 3.03 | 175 | 6 |
| 14 | 29.9 | 2.98 | 180 | 7 |
| 15 | 30.3 | 2.95 | 180 | 7 |
| 16 | 33.2 | 2.70 | 140 | 5 |
| 17 | 38.1 | 2.36 | 130 | 5 |
| 18 | 44.1 | 2.05 | 130 | 5 |

[1] dA=Interplanar spacing expressed in Angstrom units.
[2] I=Intensity in counts per second over background.
[3] I/I max.=Relative intensity.
s =An unresolved shoulder on a more intense reflection.

By comparison, a nickel chelate (hereinafter referred to as the MacQueen pigment) prepared from the bisulfite derivative of 1-nitroso-2-naphthol according to the procedure of Example 1 of the aforesaid MacQueen patent, except that an equivalent amount of nickel sulfate hexahydrate was substituted for the copperas crystals and the zinc oxide was omitted, exhibited the following X-ray diffraction pattern:

| Line | 2θ | dA [1] | I [2] | Percent I/I max.[3] |
|---|---|---|---|---|
| 1 | 6.5 | 13.7 | 620 | 40 |
| 2 | 7.8 | 11.3 | 1,540 | 100 |
| 3 | 9.3 | 9.5 | 112 | 7 |
| 4 | 10.2 | 8.7 | 338 | 22 |
| 5 | 11.2 | 7.9 | 225 | 15 |
| 6 | 13.6 | 6.5 | | s |
| 7 | 14.0 | 6.3 | 1,050 | 68 |
| 8 | 15.5 | 5.71 | 205 | 13 |
| 9 | 17.1 | 5.18 | 300 | 19 |
| 10 | 18.7 | 4.74 | 200 | 13 |
| 11 | 19.4 | 4.58 | 800 | 52 |
| 12 | 20.3 | 4.37 | 65 | 4 |
| 13 | 21.8 | 4.08 | 320 | 21 |
| 14 | 23.4 | 3.80 | 320 | 21 |
| 15 | 24.6 | 3.64 | 105 | 7 |
| 16 | 26.8 | 3.32 | 290 | 19 |
| 17 | 27.4 | 3.25 | 195 | 13 |
| 18 | 29.1 | 3.07 | 245 | 16 |
| 19 | 41.4 | 2.18 | 55 | 4 |

[1] dA=Interplanar spacing expressed in Angstrom units.
[2] I=Intensity in counts per second over background.
[3] I/I max.=Relative intensity.
s =An unresolved shoulder on a more intense reflection.

Lightfastness of the pigment of this example and the MacQueen pigment were compared on paper drawouts in a Fadeometer. The inks used for these drawouts were prepared by mulling the pigments in litho varnish and then reducing the resulting dispersions with either aluminum hydrate paste or zinc white paste, the same pigment-to-vehicle ratio and same reduction being employed for each. The pigment of this example showed slight fading after 200 hours of exposure of the zinc white drawout and after 400 hours of exposure of the aluminum hydrate drawout whereas the prior art MacQueen pigment showed considerable fading after 8 hours of exposure using either the zinc white or aluminum hydrate drawout.

The product of this example was also evaluated as a pigment by dispersing the product with or without nonleafing aluminum paste in enamel vehicles, spraying the enamel on test panels, or applying the enamel to aluminum foil with a coating rod and then heating the coated panels or foil for 30 minutes at 121° C. All of the enamels which contained aluminum paste or which were applied over aluminum gave attractive transparent coatings having a golden-brown to gold appearance which did not show more than a slight degree of fading after 200 hours of exposure in the Weather-O-Meter. The compositions of the enamels, the amount of pigment, and the substrate employed in these tests are tabulated below.

| Test No. | Enamel Composition | Percent Pigment | Percent Al Paste by Weight of Pigment | Substrate |
|---|---|---|---|---|
| 1 | 85% short oil spya alkyd resin, 15% melamine formaldehyde resin. | 2 | 0 | Aluminum foil. |
| 2 | ___do___ | 15 | 35 | Automotive steel panel. |
| 3 | 75% short oil soya alkyl resin, 25% melamine formaldehyde resin. | 2 | 0 | Aluminum panel. |
| 4 | ___do___ | 2 | 0 | Coated cardboard stock. |

By comparison, coatings prepared in the same manner as above except that transparent iron oxide was substituted for the nickel pigment of this invention were dull and dirty in appearance.

When the baked enamel coating of test number 4 was overstriped with white lacquer or overstriped with white alkyd-melamine formaldehyde enamel and baked, no bleeding of the pigment into the overstriping was observed.

The solubility characteristics of the pigment of this example were also evaluated as follows:

*Paraffin wax.*—No visual discoloration of the wax was observed when 1 part pigment was heated to 85° C. with 20 parts paraffin wax was then filtered.

*n-Hexane.*—Neither visual nor photometric discoloration of n-hexane was observed when 1 part pigment was stirred with 10 parts n-hexane for 2 hours at 57° C. and then filtered.

*Acid and alkali.*—No visual differences in hue or intensity were observed when paper drawouts which had been partially immersed in 5% soda ash solution or 1.5% hydrochloric solution for 15 minutes were dried and compared with the nonimmersed portion of the drawout. The paper drawouts for these tests were prepared by mulling 5 parts pigment with 8 parts litho varnish, applying the resulting ink to paper sheets with a drawout knife, and then drying the paper sheets at room temperature.

*Example 2*

17.8 parts (0.1 mole) of 1-nitroso-2-naphthol (prepared by adding sulfuric acid to an alkaline solution of 0.42 mole of β-naphthol and 0.41 mole of sodium nitrite at 0° C.) was stirred into 1500 parts of water containing 50.3 parts of 29% ammonium hydroxide and 1.2 parts of the sodium salt of condensed naphthalene sulfonic acid as dispersing agent for 30 minutes at 20° C., and a solution of 13.6 parts (0.05 mole) of nickel sulfate hexahydrate in 100 parts of water was added over one hour. The slurry was heated to boiling and filtered and the residue was washed free of sulfate ions with water and then dried at 82° C. The resulting product (designated as product A) exhibited an X-ray diffraction pattern unlike that of the pigment of Example 1, and when tested for lightfastness according to the procedure of Example 1, showed considerable fading of both aluminum hydrate and zinc white drawouts after 8 hours of exposure.

A portion of product A obtained above was then heated in an open container for 24 hours at 175° C. The heat-treated product (designated as product B) exhibited an X-ray diffraction pattern unlike that of product A and substantially identical with that of the pigment of Example 1. When product B was tested for lightfastness according to the procedure of Example 1, only a relatively small degree of fading was noted after 200 hours of exposure with the zinc white drawout and after 400 hours of exposure with the aluminum hydrate drawout. The X-ray diffraction patterns for each of these products are recorded below.

PRODUCT A

| Line | 2θ | dA [1] | I [2] | Percent I/I max.[3] |
|---|---|---|---|---|
| 1 | 5.5 | 16.0 | 2,450 | 100 |
| 2 | 16.7 | 5.32 | 1,575 | 64 |
| 3 | 18.7 | 4.76 | 1,050 | 43 |
| 4 | 21.3 | 4.17 | 85 | 3 |
| 5 | 23.6 | 3.77 | 1,100 | 45 |
| 6 | 24.8 | 3.59 | 270 | 11 |
| 7 | 30.1 | 2.97 | 400 | 16 |
| 8 | 33.9 | 2.64 | 190 | 8 |
| 9 | 37.9 | 2.38 | 280 | 11 |
| 10 | 48.3 | 1.884 | 195 | 8 |

PRODUCT B

| Line | 2θ | dA [1] | I [2] | Percent I/I max.[3] |
|---|---|---|---|---|
| 1 | 7.6 | 11.7 | 2,800 | 100 |
| 2 | 9.1 | 9.7 | 1,075 | 38 |
| 3 | 9.5 | 9.3 | | s |
| 4 | 12.8 | 6.9 | 150 | 5 |
| 5 | 13.6 | 6.5 | 125 | 4 |
| 6 | 14.7 | 6.0 | 830 | 30 |
| 7 | 18.2 | 4.89 | 475 | 17 |
| 8 | 19.5 | 4.56 | 500 | 18 |
| 9 | 21.2 | 4.21 | 300 | 11 |
| 10 | 24.4 | 3.65 | 650 | 23 |
| 11 | 25.6 | 3.48 | 250 | 9 |
| 12 | 29.0 | 3.08 | 118 | 4 |
| 13 | 30.6 | 2.92 | 155 | 5 |
| 14 | 32.5 | 2.75 | 275 | 10 |
| 15 | 36.5 | 2.46 | | s |
| 16 | 37.2 | 2.42 | 160 | 6 |

[1] dA=Interplanar spacing expressed in Angstrom units.
[2] I=Intensity in counts per second over background.
[3] I/I max.=Relative intensity.
s=An unresolved shoulder on a more intense reflection.

*Example 3*

A portion of product A of Example 2 was ground through a 1/32" screen, was agitated with 2.5 times its weight of xylene, was allowed to stand for 2.5 hours in a closed container, and then was heated in an open container for 24 hours at 175° C.

The X-ray diffraction pattern of the resulting pigment indicated that its major component was substantially identical with the pigment of Example 1, the pigment exhibiting under examination with the electron microscope a product composed essentially of acicular crystals having a maximum length of about 0.2 micron. When the pigment was tested for lightfastness according to the procedure of Example 1, the paper drawouts indicated fade resistances comparable to those from the pigment of Example 1. When the pigment was tested in enamel according to the procedure of Example 1, coatings were formed which exhibited much greater cleanliness and transparency than those obtained using product B of Example 2.

*Examples 4–5*

The procedure of Example 3 was repeated with the exception that the heating was carried out at 120° C. for 48 hours (Example 4) or 270° C. for 1 hour (Example 5) instead of 175° C. for 24 hours. The products of these examples exhibited X-ray diffraction patterns and a degree of lightfastness substantially identical with the pigment of Example 1.

What I claim and desire to protect by Letters Patent is:

A composition of matter comprising a crystalline, light stable nickel chelate of 1-nitroso-2-naphthol, said chelate being characterized by an X-ray diffraction pattern which exhibits strongest d-spacings at about 11.6, 9.6, 6.0, 4.9, 4.5, and 3.6 Angstroms.

References Cited

UNITED STATES PATENTS

| 1,999,971 | 3/1935 | MacQueen | 260—439 |
| 2,178,809 | 11/1939 | Rosenblatt | 260—429 |
| 2,259,641 | 10/1941 | Horning | 260—439 |
| 2,726,920 | 12/1955 | Federkiel et al. | 260—439 |

A. P. DEMERS, *Assistant Examiner.*

TOBIAS E. LEVOW, *Primary Examiner.*